United States Patent [19]

Yamamoto et al.

[11] Patent Number: 4,731,001

[45] Date of Patent: Mar. 15, 1988

[54] APPARATUS FOR MAKING COTTON CANDY

[75] Inventors: Isao Yamamoto; Akio Iida, both of Maebashi; Kaoru Kikuchi, Gunma, all of Japan

[73] Assignees: Toshiba Electric Appliances Co., Ltd., Maebashi, Japan; Robeson Industries Corp., Mineola, N.Y.

[21] Appl. No.: 898,023

[22] Filed: Aug. 19, 1986

[30] Foreign Application Priority Data

Oct. 31, 1985 [JP] Japan ............................ 60-167626[U]
May 23, 1986 [JP] Japan .............................. 61-76881[U]

[51] Int. Cl.[4] .......................................... B28B 13/00
[52] U.S. Cl. ................................... 425/7; 264/8; 425/8; 425/9
[58] Field of Search ............... 425/7, 8, 9, 143; 264/8; 249/171, 172

[56] References Cited

U.S. PATENT DOCUMENTS

| | | | |
|---|---|---|---|
| 156,470 | 11/1874 | Warner | 249/172 |
| 341,161 | 5/1886 | Ormerod | 249/171 |
| 618,428 | 1/1899 | Morrison et al. | 425/9 |
| 792,710 | 6/1905 | Kochs | 425/9 |
| 1,510,940 | 10/1924 | Hath | 425/9 |
| 1,714,379 | 5/1929 | Kratz | 249/172 |
| 2,908,039 | 10/1959 | Amos | 425/143 |
| 3,125,967 | 3/1964 | Bowe | 425/9 |
| 3,174,182 | 3/1965 | Duncan | 425/7 |
| 3,232,244 | 2/1966 | Wallace et al. | 425/9 |
| 3,279,394 | 10/1966 | Bowe | 425/9 |
| 4,323,524 | 4/1982 | Snowden | 264/8 |
| 4,440,700 | 4/1984 | Okada et al. | 264/8 |
| 4,501,538 | 2/1985 | Bray et al. | 425/9 |

FOREIGN PATENT DOCUMENTS

| | | |
|---|---|---|
| 43-15597 | 7/1968 | Japan .................................... 264/8 |
| 828648 | 2/1960 | United Kingdom . |
| 834385 | 5/1960 | United Kingdom . |
| 886969 | 1/1962 | United Kingdom . |
| 1266580 | 3/1972 | United Kingdom . |
| 1360706 | 7/1974 | United Kingdom . |

Primary Examiner—Jay H. Woo
Assistant Examiner—C. S. Bushey
Attorney, Agent, or Firm—Oblon, Fisher, Spivak, McClelland & Maier

[57] ABSTRACT

A cotton candy making apparatus includes a hollow rotary member to be rotated, the rotary member being provided with a supply port for supplying sugar to the interior thereof and path for delivering molten sugar to a peripheral edge of the rotary member, a heating device located below the rotary member to heat the rotary member and hence heat and melt sugar in the rotary member, a fan for producing an air flow to the rotary member, the fan being rotated together with the rotary member, and a deflection device arranged between the fan and the heating device to guide the air flow from the fan to the peripheral edge of the rotary member. The rotary member has an extended flange extending radially outward from the peripheral edge of the rotary member.

13 Claims, 31 Drawing Figures

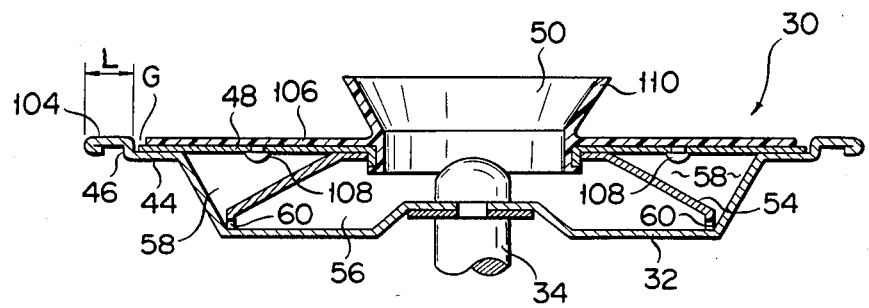
F I G. 11
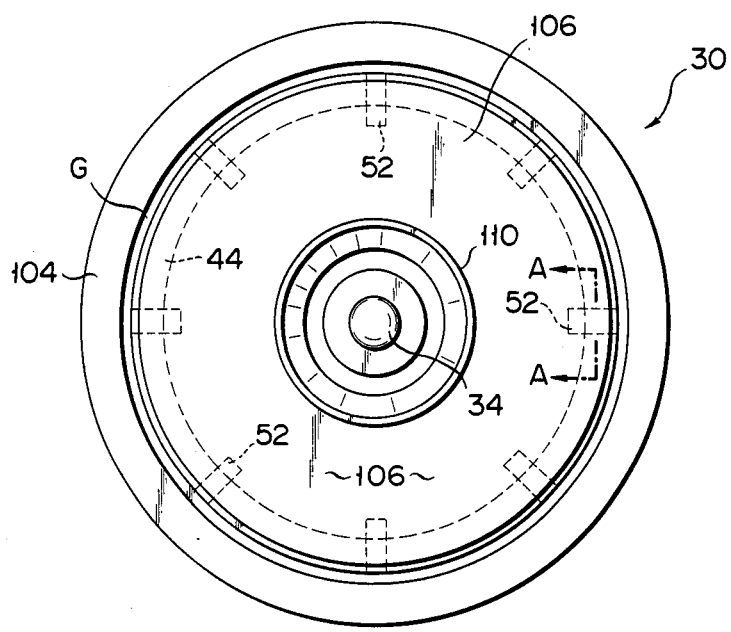
F I G. 12
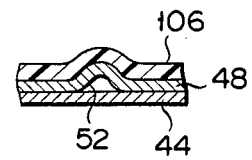
F I G. 13

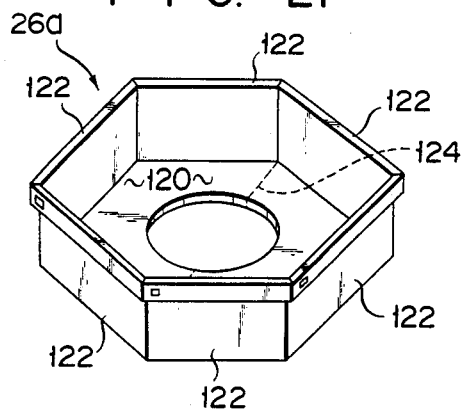
F I G. 21
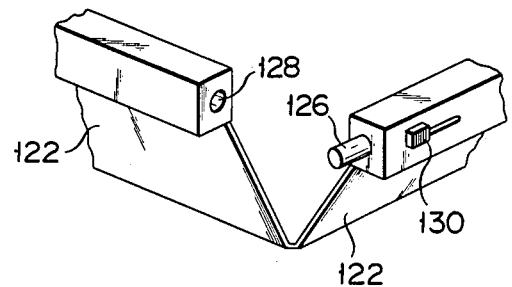
F I G. 22
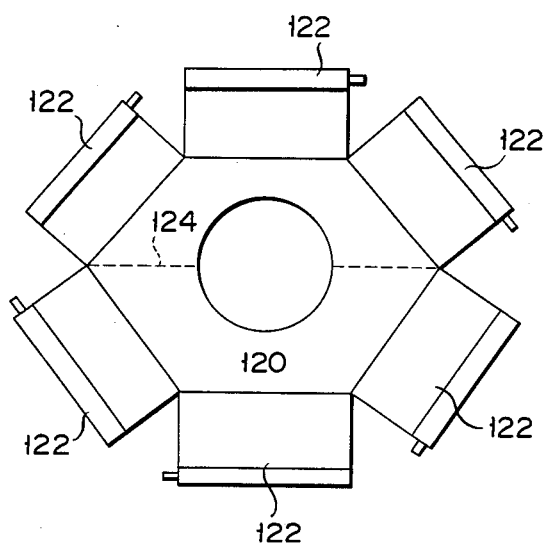
F I G. 23
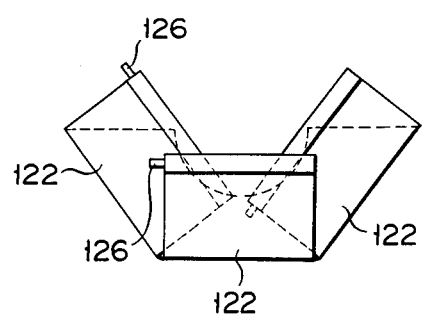
F I G. 24

APPARATUS FOR MAKING COTTON CANDY

BACKGROUND OF THE INVENTION

The present invention relates to an apparatus for making cotton candy and, more particularly, to an apparatus for making a cotton candy at home.

The basic structure of a conventional cotton candy making machine will be described below. The machine includes a hollow rotary member rotated by an electric motor and having a sugar supply port at the center of the rotary member, and a heating means for heating and melting sugar supplied to the rotary member through the sugar supply port. Molten sugar in the rotary member is guided toward the peripheral wall of the rotary member by a centrifugal force upon its rotation. Apertures are formed on the peripheral wall of the rotary member so that molten sugar is spinned therethrough, thus obtaining a fibrous candy.

The cotton candy making machine also includes a fan for producing an upward air flow around the rotary member. The air flow from the fan causes outward dispersion of the fibrous candy obtained by spinning the molten sugar through the apertures, along the radial direction of the rotary member, thereby obtaining a good fibrous state. The fibrous candy is stuck around a stick to prepare cotton candy.

In the conventional cotton candy making machine, the air flow from the fan cools the rotary member itself. In order to cause the heater means to sufficiently heat and melt sugar supplied to the rotary member, the heating means has a high power. The power consumption of the heater means is increased, and it takes a long period of time to heat the rotary member to a predetermined temperature. Therefore, the conventional cotton candy making machine is not suitable for use at home.

The air stream from the fan is partially deflected by the rotary member at random, and the random deflection causes turbulence of the air flow in the atmosphere around the rotary member. The fibrous candy produced by spinning molten sugar through the apertures of the rotary member is disturbed accordingly and dispersed at random along the radial direction of the rotary member. As a result, a good fibrous candy cannot be sufficiently obtained, and it is difficult to make a soft, smooth cotton candy.

Furthermore, since molten sugar spun through the apertures of the rotary member consists of relatively large particles, effective dispersion of the particles by the air flow cannot be performed. This also makes it difficult to make a soft, smooth cotton candy. Demand has thus arisen for providing a new and improved rotary member capable of making a cotton candy of high quality.

SUMMARY OF THE INVENTION

It is an object of the present invention to provide an apparatus for making a cotton candy, wherein power consumption of a heater means for heating and melting sugar can be reduced, and a smooth cotton candy can be made.

It is another object of the present invention to provide a rotary member suitable for making a cotton candy of high quality.

In order to achieve the first object of the present invention, there is provided an apparatus for making a cotton candy of high quality, comprising: an electric motor having an output shaft extending upward; a fan rotated together with the output shaft to produce an upward air flow; heater means arranged above the fan; a rotary member arranged above the heater means and rotated together with the output shaft, the rotary member being provided with a sugar chamber defined inside the rotary member and path means for guiding molten sugar from the sugar chamber melted by heat from the heater means to a peripheral edge of the rotary member, the path means being open at the peripheral edge of the rotary member; and deflecting means, disposed between the heater means and the fan, for deflecting the air flow from the fan upon rotation thereof toward the peripheral edge of the rotary member.

Since the cotton candy making machine has the deflecting means, the air flow from the fan can be suitably guided toward the peripheral edge of the rotary member. The molten sugar spun from the peripheral edge of the rotary member is effectively dispersed by the air flow guided by the deflecting means, thereby making a cotton candy of high quality. The air flow from the fan does not blow against the rotary member because of the presence of the deflecting means so that the rotary member is not cooled by the air flow. As a result, the heating capacity required in the heater means and hence power consumption of the heater means can be reduced.

In order to achieve the second object of the present invention, there is provided a rotary member used in an apparatus for making cotton candy, comprising: a traylike rotary vessel to be rotated; a cover for covering an upper surface of the rotary vessel, the cover being provided with a supply port for receiving sugar in the rotary vessel; path means for guiding the molten sugar in the rotary member to the peripheral edge of the rotary member when the sugar supplied to the rotary member is heated and melted, the path means being provided with openings open at the peripheral edge of the rotary member; and a flange extending from the peripheral edge of the rotary vessel outward to guide the molten sugar supplied from the openings of the path means.

According to the rotary member described above, since the extended flange is formed at the peripheral edge of the rotary member, the molten sugar supplied from the openings of the path means receives a centrifugal force upon rotation of the rotary member and extends as a thin film on the extended flange. When the thin-film molten sugar is dispersed from the peripheral edge of the flange, the molten sugar particles can be reduced in size, thereby making soft, smooth cotton candy.

BRIEF DESCRIPTION OF THE DRAWINGS

FIGS. 10 and 11 are sectional views showing other rotary members, respectively;

FIG. 12 is a plan view of the rotary member in FIG. 11;

FIG. 13 is a sectional view of the rotary member in FIG. 11 taken along the line A—A of FIG. 12;

FIG. 21 is a perspective view showing a modification of a bowl used in the cotton candy making machine;

FIG. 22 is an enlarged perspective view showing part of the bowl in FIG. 21;

FIG. 23 is a developed view of the bowl in FIG. 21;

FIG. 24 is a plan view showing a folded state of the bowl in FIG. 21;

DETAILED DESCRIPTION OF THE PREFERRED EMBODIMENTS

Figure 1:
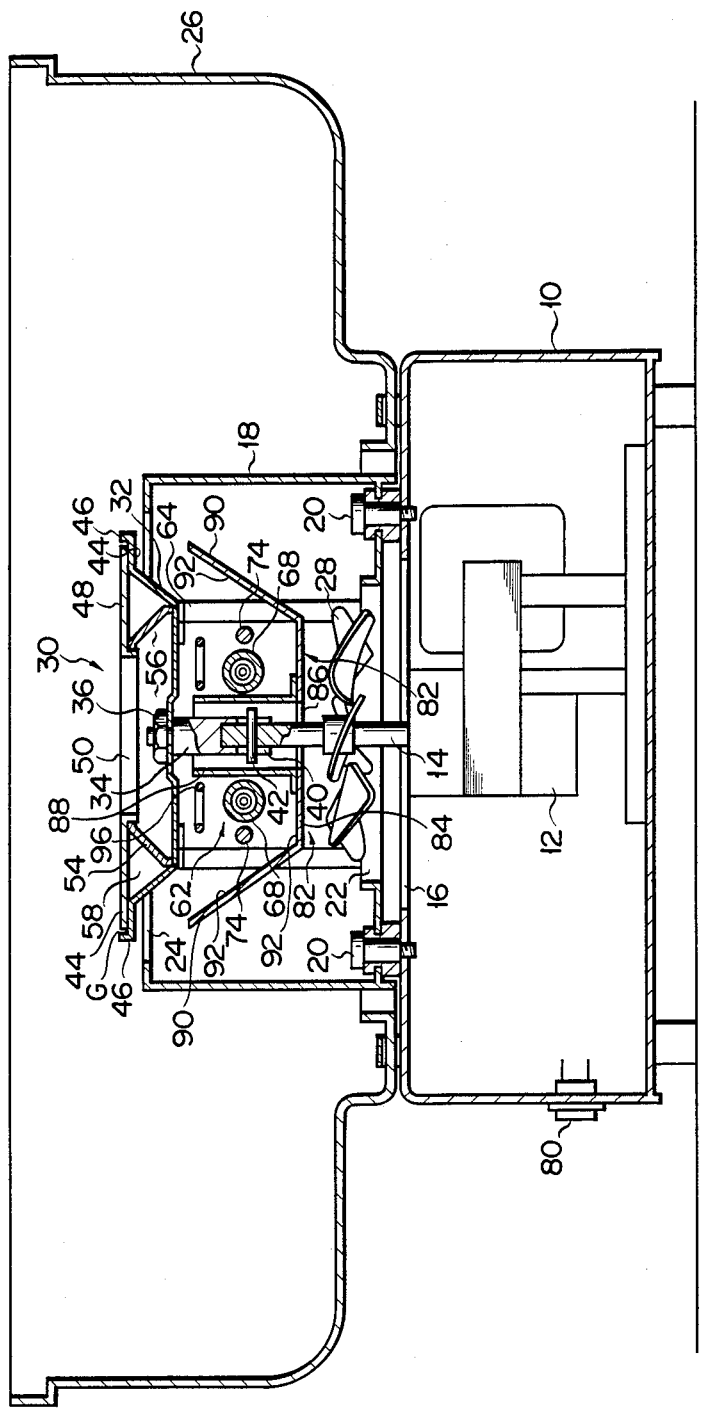
FIG. 1 is a sectional view of a cotton candy making machine.

The overall structure of a cotton candy making machine is shown in FIG. 1. The machine includes housing 10. Electric motor 12 is arranged inside housing 10. Output shaft 14 of motor 12 extends upward through circular opening 16 formed in the upper wall of housing 10.

Cylindrical cover 18 is disposed on the upper wall of housing 10 to surround the portion defining opening 16. The lower wall of cover 18 is fixed to the upper wall of housing 10 by a plurality of fastening screws 20. Openings 22 and 24 are respectively formed in the upper and lower walls of cover 18 and are concentric with opening 16 in housing 10. Therefore, output shaft 14 of motor 12 extends in cover 18 through opening 22 thereof.

Bowl 26 having a larger diameter than that of housing 10 is disposed on the upper wall of housing 10 so as to surround cover 18. Bowl 26 is detachably mounted on housing 10.

Fan 28 is mounted on shaft 14 (of motor 12) extending inside cover 18. Fan 28 is rotated upon rotation of shaft 14, thereby generating an air flow from housing 10 in to cover 18.

Figure 2:
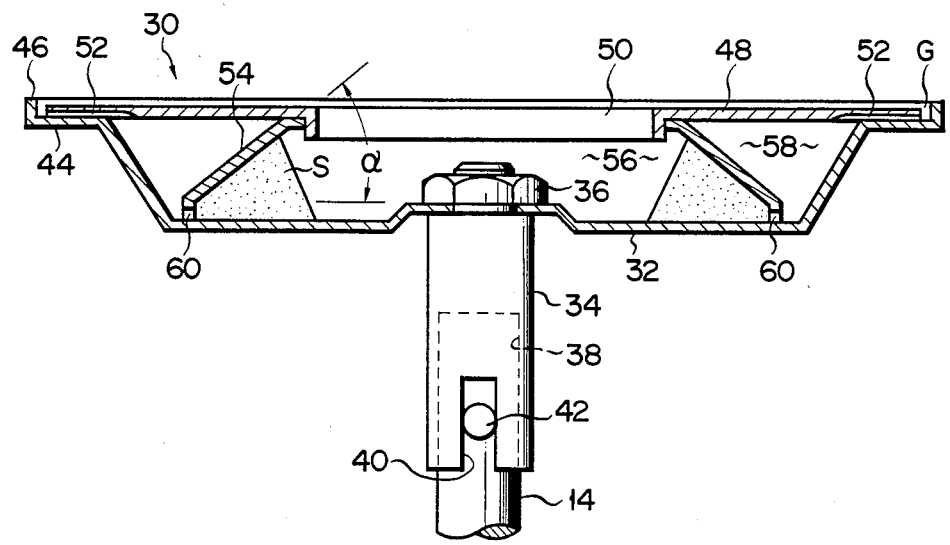
FIG. 2 is an enlarged sectional view of a rotary member used in the machine in FIG. 1.
Figure 3:
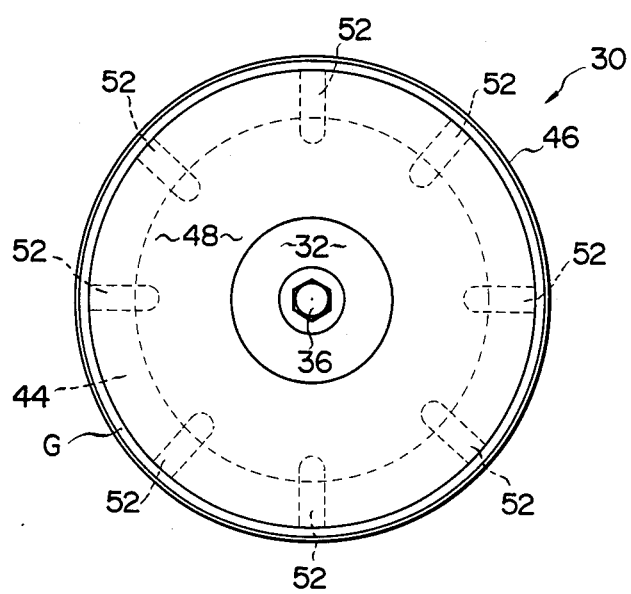
FIG. 3 is a plan view of the rotary member in FIG. 2.

Rotary member 30 is detachably mounted at the distal end of shaft 14 of motor 12. As shown in FIG. 2, rotary member 30 includes a circular tray-like rotary vessel 32. Connecting shaft 34 concentric with rotary vessel 32 is mounted on the lower wall of rotary vessel 32. The upper end of connecting shaft 34 extends through the lower wall of rotary vessel 32 and is fixed to vessel 32 through nut 36. Bore 38 is open at the lower end of connecting shaft 34. Bore 38 has a diameter enough to receive shaft 14 of motor 12 and coaxially extends from the lower end to the upper end side of connecting shaft 34. In addition, a pair of slots 40 is formed on the outer surface of shaft 34 and axially extends from the lower end of shaft 34. A pair of pins 42 extend from the outer surface of the upper end portion of shaft 14 of motor 12 in opposite radial directions. Pins 42 have a size enough to be fitted in slots 40 in shaft 34. As shown in FIG. 2, when shaft 14 of motor 12 is inserted in bore 38 in shaft 34, pins 42 are fitted in slots 40 so that shaft 34 is coupled to shaft 14. The rotational force of shaft 14 in motor 12 can be transmitted to shaft 34, and therefore, rotary vessel 32, so that vessel 32 can be rotated. When vessel 32 is pulled upward from shaft 14 of motor 12 in the coupling state in FIG. 2, vessel 32 can be removed from shaft 14.

When rotary vessel 32 is mounted on output shaft 14 of electric motor 12, the peripheral edge of vessel 32 slightly extends upward from the upper end of cover 18, as shown in FIG. 1.

Horizontal flange portion 44 is formed at the peripheral edge of vessel 32. Vertical annular rib 46 is formed at the edge of flange portion 44.

Circular cover 48 is detachably mounted on vessel 32 to define the inner space of vessel 32. Cover 48 has sugar supply port 50 at its center. The peripheral edge of cover 48 is placed on flange portion 44 of vessel 32. The diameter of cover 48 is slightly smaller than the inner diameter of annular rib 46 in vessel 32 to define predetermined gap G between the outer surface of cover 48 and annular rib 46. In practice, gap G is set to be 0.3 mm to 0.5 mm. Eight grooves are formed in the lower surface of the peripheral portion of cover 48 at equal intervals. These grooves extend along the radial direction of cover 48. The outer end of each groove is open at the edge of cover 48. The inner edge of each groove extends over the inner edge of flange portion 44. Therefore, eight guide paths 52 are formed between the outer edge of cover 48 and flange 44 of vessel 32 at equal intervals. The cross-sectional area of each guide path 52 is very small. In this embodiment, the grooves are formed in the lower surface of the outer edge portion of cover 48. However, the grooves may be formed in the upper surface of flange 44 in vessel 32 to obtain the same guide paths 52 as in the above embodiment.

Partition member 54 is disposed inside rotary member 30 with vessel 32 and cover 48. In this embodiment, partition member 54 comprises a frustoconical member with open ends. The small-diameter upper open end of partition member 54 is in contact with the lower surface of cover 48 and communicates with the supply port 50 of cover 48. The large-diameter lower open end of partition member 54 is in contact with the inner bottom surface of vessel 32. The inner space of rotary member 30 is partitioned by partition member 54 into inner chamber 56 communicating with hole 50 of cover 48 and outer chamber 58 communicating with guide paths 52. In this embodiment, partition member 54 is clamped between cover 48 and vessel 32 upon mounting of cover 48 on vessel 32 and is thus fixed inside rotary member 30. An inclined angle α (FIG. 2) of the tapered portion of member 54 is set to be 45° or less.

A plurality of small notches are formed at the lower peripheral end of partition member 54 at equal intervals. The notches correspond to communicating paths 60 for allowing chamber 56 to communicate with chamber 58.

Heating unit 62 is arranged between rotary member 30 and fan 28. As shown as an exploded view in FIG. 4, heating unit 62 comprises a pair of support plates 64. Plates 64 oppose each other so as to sandwich output shaft 14 of motor 12 therebetween. A pair of legs 64a are formed at the lower end of each plate 64. Screw holes 66 are respectively formed in legs 64a. Therefore, the fastening screws (not shown) are respectively inserted in holes 66 of legs 64a and screwed in the bottom wall of cover 18 so that the pair of support plates 64 are fixed on the bottom surface of cover 18.

A pair of horizontal main heaters 68 are arranged between the pair of support plates 64 so as to sandwich shaft 34 of rotary member 30 therebetween. Both ends of each main heater 68 are supported by the corresponding support plates 64. In this embodiment, each main heater 68 comprises tube 70 made of quartz glass, and resistor heater 72 inserted in tube 70. A pair of subheaters 74 parallel to main heaters 68 are arranged outside main heaters 68 between the pair of support plates 64. Both ends of subheaters 74 are also supported by the corresponding support plates 64. Each subheater 74 comprises a resistor heater. Heaters 68 and 74 are located such that heat radiated from heaters 68 and 74 is directly applied to rotary member 30, i.e., the bottom wall of vessel 32, as is apparent from FIG. 1.

Figure 5:
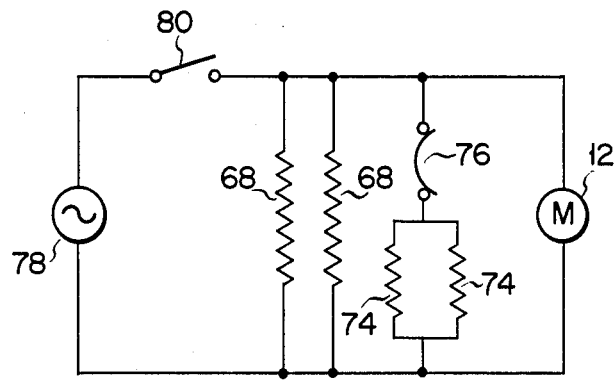
FIG. 5 is a circuit diagram of the machine in FIG. 1.

As is apparent from the electric circuit in FIG. 5, main heaters 68 and subheaters 74 are connected in parallel with electric motor 12. The electric circuit also includes thermostat 76 connected in parallel with motor 12 and heaters 68 and in series with subheaters 74. Thermostat 76 is illustrated in only FIG. 5 and is operated according to the temperature of the bottom wall of vessel 32 in rotary member 30. For example, if the temperature of the bottom wall of vessel 32 is less than a temperature falling within the range of 180° C. to 200° C., the thermostat is closed to energize subheaters 74. However, if the temperature of the bottom wall of vessel 32 exceeds a temperature falling within the above range, the thermostat is opened to deenergize subheaters 74. Reference numeral 78 in FIG. 5 denotes an AC source; and 80, a power switch of the cotton candy making machine. Switch 80 is arranged on the side wall of housing 10, as shown in FIG. 1.

Figure 4:
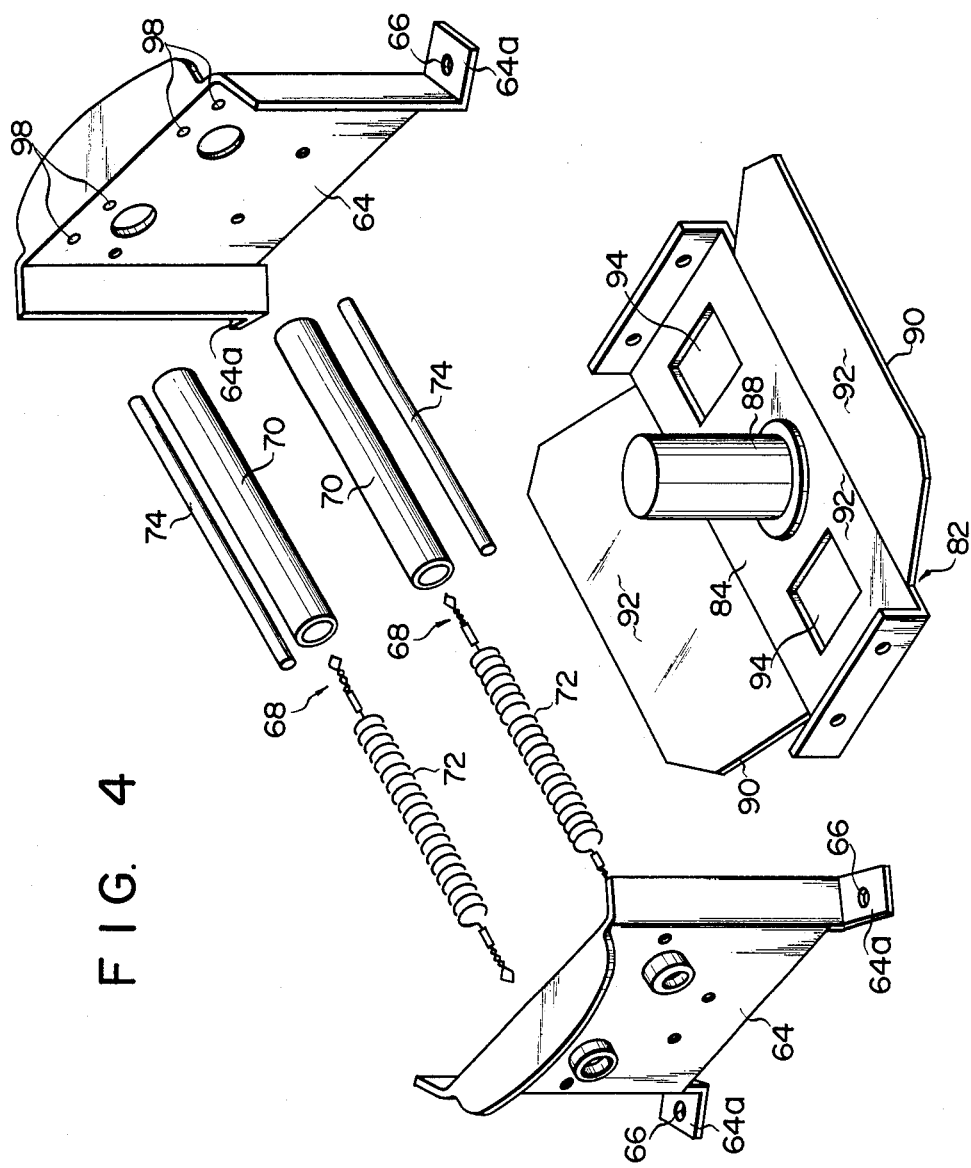
FIG. 4 is an exploded perspective view showing heating and deflection devices incorporated in the machine in FIG. 1.

Deflection device 82 is arranged between fan 28 and heaters 68 and 74 to deflect the air flow generated upon rotation of fan 28. As best shown in FIG. 4, deflection device 82 includes horizontal plate portion 84 extending along main heaters 68. Both ends of plate portion 84 are respectively supported by support plates 64. Circular hole 86 (FIG. 1) for receiving shaft 14 in motor 12 is formed at the center of plate 84. Pipe 88 extends upward on the upper surface of plate portion 84 so as to surround output shaft 14 and shaft 34 (of vessel 32) both of which extend through hole 86.

A pair of inclined plate portions 90 extend from both sides of plate portion 84. Plate portions 90 extend upward toward the peripheral edge of rotary member 30. In this embodiment, the surfaces of plate portions 84 and 90 which oppose heaters 68 and 74 are formed by reflecting surfaces 92, respectively. As is apparent from FIG. 4, vent ports 94 are formed at both end portions of plate portion 84. Protective net 96 is arranged between rotary member 30 and heaters 68 and 74 so as to cover them from the top, as shown in FIG. 1. Protective net 96 is not illustrated in FIG. 4, but holes 98 for mounting net 96 are formed in plate portion 64.

The operation of the cotton candy making machine will be described hereinafter.

When power switch 80 arranged on housing 10 is turned on, electric motor 12 is driven, as is apparent from the electric circuit in FIG. 5. Rotary member 30 and fan 28 which are coupled to output shaft 14 of motor 12 are rotated at a speed of 3,000 rpm.

Figure 6:
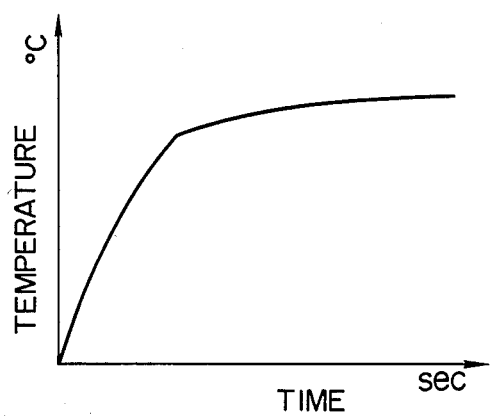
FIG. 6 is a graph showing the temperature rise of the rotary member by means of the heating device as a function of time.

Upon rotation of motor 12, main heaters 68 and subheaters 74 are energized to generate heat. Heat from heaters 68 and 74 is directly applied to the bottom wall of rotary member 30, thereby heating the bottom wall of vessel 32. Part of heat radiated from heaters 68 and 74 is reflected by reflecting surfaces 92 of deflection device 82. Heat reflected by reflecting surfaces 92 is also applied to the bottom wall of vessel 32. Therefore, the bottom surface of vessel 32 is effectively heated by heat from heaters 68 and 74 and heat reflected by reflecting surfaces 92. The temperature of the bottom wall of vessel 32 is quickly increased, as shown in FIG. 6. More specifically, the bottom surface of vessel 32 is quickly heated to 180° C. to 200° C., hot enough to melt sugar.

When the temperature of the bottom wall of rotary vessel 32 reaches the predetermined temperature, thermostat 76 shown in FIG. 5 is opened, and energization of subheaters 74 is stopped. Thereafter, the bottom wall of vessel 32 is heated by only main heaters 68. In this case, the temperature of the bottom wall of vessel 32 is kept at a predetermined temperature within the range of 180° C. to 200° C.

When a predetermined amount of sugar is poured from supply port 50 of rotary member 30 while the bottom wall of vessel 32 is kept heated at the predetermined temperature, sugar S is radially moved toward the inner wall surface of partition member 54 by a centrifugal force upon rotation of vessel 32, as shown in FIG. 2. Since partition member 54 has a frustoconical shape, sugar is stopped and sandwiched between the bottom wall of vessel 32 and the inner surface of the tapered portion of partition member 54 so that the contact area between sugar and the bottom wall of vessel 32 can be increased and that sugar stopped by partition member 54 can be effectively heated by heat from the bottom wall of vessel 32 and gradually melted. Molten sugar receives a centrifugal force upon rotation of rotary member 30 and is guided to outer chamber 58 of rotary member 30 through connecting paths 60 of partition member 54. At the same time, the molten sugar flows along the bottom surface of vessel 32 defined by outer chamber 58 and reaches annular gap G of rotary member 30 through guide paths 52. The molten sugar is thus stored in gap G and receives a centrifugal force. By this force, the molten sugar flows over annular rib 46 of vessel 32 and is scattered from the edge of rotary member 30 outward to obtain a fibrous candy.

When the molten sugar is radially scattered from the edge of rotary member 30, an air flow generated upon rotation of fan 28 is sprayed from the gap between the outer edge of rotary member 30 and the upper end of cover 18 so that molten sugar can be scattered far toward the radial direction of rotary member 30, thereby making soft cotton candy in bowl 26. The upward air flow from fan 28 is deflected by deflection device 82 and guided toward the edge of rotary member 30. More specifically, the air flow from fan 28 blows against plate portion 84 of deflection device 82 and flows along the pair of plate portions 90 so that the air flow is guided toward the peripheral edge of rotary member 30. The air flow from fan 28 is guided toward the peripheral edge of rotary member 30 without being disturbed. Therefore, the air flow sprayed upward from the peripheral edge of rotary member 30 can be uniform. As a result, the fibrous candy can be uniformly scattered by the uniform air flow from the peripheral edge of rotary member 30. The resultant fibrous candy is stuck to a stick to prepare a cotton candy which is then removed from bowl 26.

Most of the air flow from fan 28 is guided to the peripheral edge of rotary member 30, and rotary vessel 32, i.e., the bottom wall thereof is effectively prevented from cooling by the air flow. Therefore, main heaters 68 can have relatively low power consumption to maintain the bottom surface of vessel 32 at the predetermined temperature. In addition, when the temperature of the bottom wall of vessel 32 does not reach the predetermined temperature, i.e., at the beginning of making a cotton candy in the machine, the bottom wall of vessel 32 can be heated by main heaters 68 as well as subheaters 74 so that it can be quickly heated to the predetermined temperature. As a result, a waiting time until the machine can be available upon turning on of the power switch can be shortened.

After the use of the cotton candy making machine, the user can just pull up rotary member 30 to remove it from shaft 14 of motor 12. Therefore, the user can easily wash rotary member 30 with water after the use of the machine.

The present invention is not limited to the cotton candy making machine of the first embodiment. Various modifications of the first embodiment will be described below.

Figure 7:
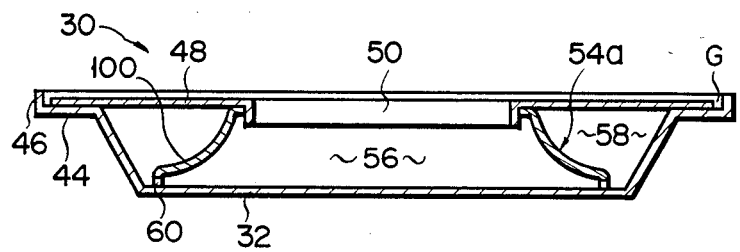
FIGS. 7 and 8 are respectively sectional views showing other rotary members.

FIG. 7 shows rotary member 30 according to a second embodiment. In this embodiment, partition member 54a in rotary member 30 has peripheral wall 100 which is caved inward.

Figure 8:
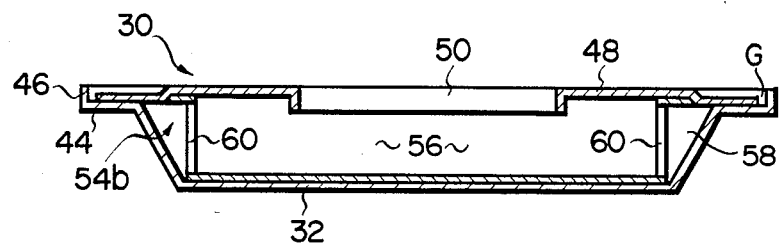
Figure 9:
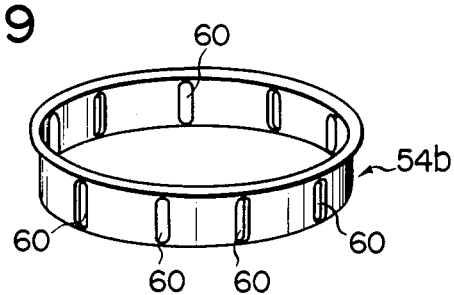
FIG. 9 is a perspective view of a partition member disposed inside the rotary member in FIG. 8.

FIG. 8 shows rotary member 30 according to a third embodiment. In rotary member 30, cylindrical partition member 54b is arranged inside rotary member 30. As shown in FIG. 9, since partition member 54b has a bottom wall, communicating paths 60 are defined by slits formed in the outer peripheral wall at equal intervals. In this case, the slits are formed without constituting steps from the bottom surface of partition member 54b.

Figure 10:
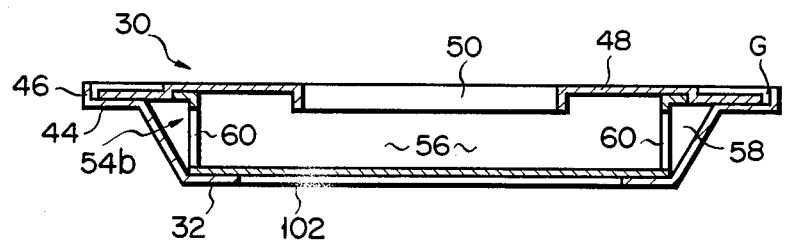

FIG. 10 shows rotary member 30 according to a fourth embodiment. This rotary member has a similar structure to that of the rotary member in FIG. 8. Rotary vessel 32 in FIG. 10 has circular hole 102. Since hole 102 is formed in the bottom wall of vessel 32, the bottom wall of the partition member 54b can be directly heated by heat from heating device 60, unlike in rotary member 30 in FIG. 8. Connecting shafts 34 of rotary members in FIGS. 7, 8, and 10 are not illustrated.

FIGS. 11 and 12 show rotary member 30 according to a fifth embodiment. In rotary member 30, extended portion 104 radially extends from annular rib 46 of rotary vessel 32. Radial length L of extended portion 104 is set to be 3 mm to 7 mm. The upper end of annular rib 46 slightly extends upward from the upper surface of cover 48, as is apparent from FIG. 11. Thus, extended portion 104 also slightly extends upward from the upper surface of cover 48.

Heat-insulating plate 106 made of heat-resistant silicone rubber or heat-resistant synthetic resin is fixed on the upper surface of cover 48. Plate 106 is fixed by a plurality of lock pawls 108 on the upper surface of cover 48, as shown in FIG. 11. Guide pipe 110 defining sugar supply port 50 integrally extends upward from the center of plate 106. The upper end portion of guide pipe 110 has a funnel-like shape and communicates with inner chamber 56 in rotary member 30. Guide pipe 110 serves as a port for supplying sugar and a knob for removing rotary member 30 from output shaft 14 of motor 12. In the fifth embodiment, the peripheral portions of cover 48 and heat-insulating plate 106 are arcuated upward to constitute a plurality of radial recesses as flow paths for guiding molten sugar, as shown in FIG. 13.

According to rotary member 30 of the fifth embodiment, since extended portion 104 radially extends from rib 46 in vessel 32, the molten sugar flows over rib 46 and forms a thin film on the entire upper surface of extended portion 104. When the thin-film molten sugar reaches the peripheral edge of extended portion 104, it is scattered from the edge of extended portion 104 to constitute a fibrous candy. In the fifth embodiment, since the particles of the molten sugar scattered from the edge of rotary member 30 are small, a soft, smooth cotton candy can be made.

Since extended portion 104 is formed radially outward from the edge of vessel 32, the diameter of rotary member 30 is increased and a centrifugal force acting on the molten sugar is also increased so that a force of the molten sugar scattered from the edge of extended portion 104 is increased. If an identical scattering force is required, the motor speed can be reduced in the fifth embodiment, as compared with the rotary member without extended portion 104. As a result, vibrations and noise upon driving of motor 12 can be reduced.

In addition, in the fifth embodiment, the upper surface of cover 48 is covered with heat-insulating plate 106. Even if the user accidentally touches the surface of the heat-insulating plate 106 upon completion of making cotton candies, the user will not get burnt. Even if the temperature of vessel 32 is high, the user can hold guide pipe 110 to remove rotary member 30 from output shaft 14 of motor 12 so that rotary member 30 can be immediately washed with water.

Figure 14:
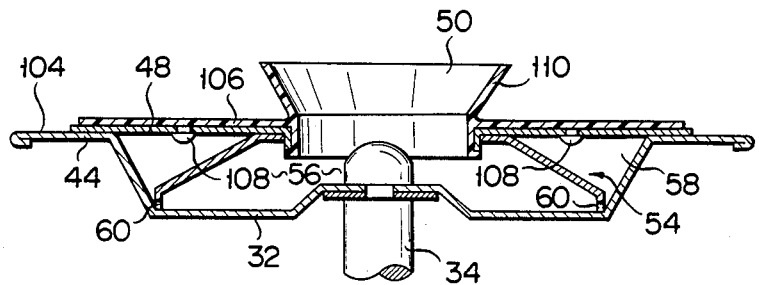
FIG. 14 is a sectional view of another rotary member of the same type as that in FIG. 11.

FIG. 14 shows rotary member 30 according to a sixth embodiment of the present invention. Rotary member 30 in FIG. 14 is similar to that in FIG. 11. However, in rotary member 30 in FIG. 14, annular rib 46 in vessel 32 is omitted so that flange portion 44 is integral with extended portion 104.

A teflon layer may be formed on the inner surface of the partition member and the bottom surface of rotary vessel 32 according to each embodiment so as to prevent sugar from getting burnt.

Figure 15:
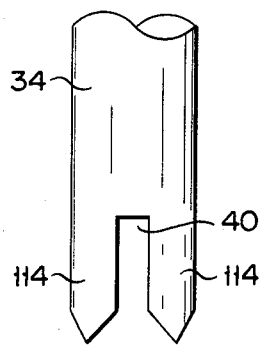
FIG. 15 is a side view showing a lower end portion of a connecting shaft of the rotary member.
Figure 16:
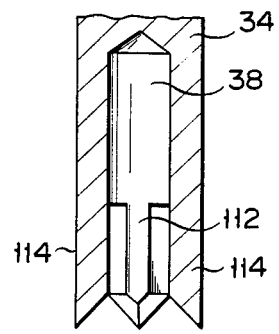
FIG. 16 is a sectional view showing the lower end portion of the connecting shaft of the rotary member.
Figure 17:
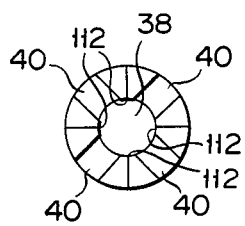
FIG. 17 is a view showing the lower end face of the connecting shaft in FIG. 15.

FIGS. 15 to 18 show modifications related to the structure of a connection between rotary member 30 and output shaft 14 of motor 12. As shown in FIGS. 15 to 17, four slots 40 are formed at the lower end portion of connecting shaft 34 at equal angular intervals. In this embodiment, as is best shown in FIGS. 16 and 17, slots 40 are formed to constitute four arcuated surfaces 112 in hole 38 at equal angular intervals. Since four slots 40 are formed in shaft 34, four fingers 114 are constituted at the lower end portion of shaft 34. The lower end portions of fingers 114 are tapered toward their distal ends.

Figure 18:
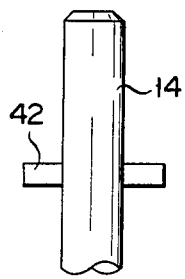
FIG. 18 is a side view showing an upper end portion of an electric motor output shaft inserted in the connecting shaft in FIG. 16.

In the above embodiment, the number of slots 40 in shaft 34 is doubled as compared with that in the connecting shaft in the first embodiment. Slots 40 in shaft 34 can be easily aligned with pins 42 in shaft 14 of motor 12, as shown in FIG. 18. As a result, rotary member 30 can be easily mounted on output shaft 14. In addition, the lower ends of fingers 114 are tapered, and pins 42 of output shaft 14 can be easily guided in slots 40 of shaft 34. Attachment of rotary member 30 can be further simplified. Even if four slots 40 are formed in shaft 34, four arcuated surfaces 112 are left on the inner surface of hole 38. When output shaft 14 is inserted in hole 38 of shaft 34, shaft 34 is brought into surface contact with shaft 14 so that the coupling state therebetween can be stabilized.

Figure 19:
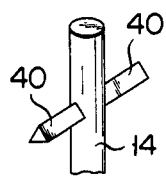
FIGS. 19 and 20 are perspective views respectively showing modifications of pins fitted in the output shaft of the electric motor.
Figure 20:
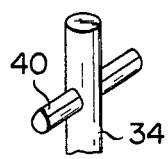

FIGS. 19 and 20 respectively show modifications of pins 40 mounted on output shaft 14 of motor 12. Pin 40 in FIG. 19 has a triangular cross-sectional shape, one vertex of which faces upward. Pin 40 in FIG. 20 has a cross-sectional shape obtained by notching axial portions of a circular rod member.

FIGS. 21 to 24 show a modification of bowl 26. Bowl 26a in FIG. 21 comprises hexagonal bottom plate 120 and six side plates 122 coupled to the sides of bottom plate 120 through hinges (not shown). A hole is formed at the center of bottom plate 120 to receive cover 18. Fold 124 is formed at the central line of bottom plate 120 so as to bend it into halves through a hinge (not shown). Side plates 122 can be coupled to each other through engaging pins 126 in an upright state in FIG. 21. More specifically, as shown in FIG. 22, hole 128 is formed at one end face of each side plate 122 and is engaged with pin 126 extending on the corresponding face of the adjacent side plate 122. Pin 126 is retractibly extending on the end face of each side plate 122. Retraction/extraction of pin 126 is performed by operating sliding knob 130 arranged on the outer surface of the corresponding side plate 122.

According to bowl 26a described above, when the cotton candy making machine is not used, plates 122 are disengaged from each other upon retraction of engaging pins 126, so that bowl 26a can be developed, as shown in FIG. 23. Thereafter, bottom plate 120 is folded into halves about fold 124, and bowl 26a can be stored in a compact manner.

Figure 25:
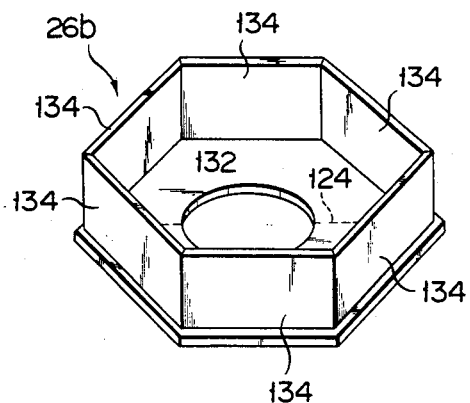
FIG. 25 is a perspective view of another bowl.
Figure 26:
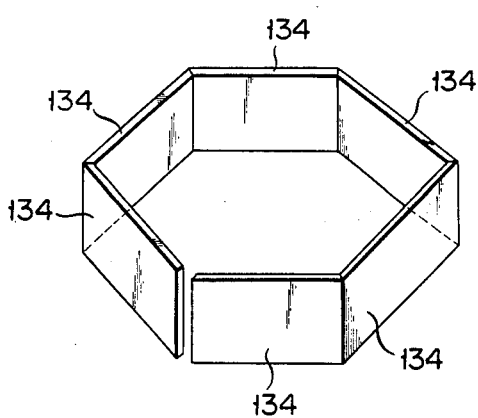
FIG. 26 is a perspective view of bowl (FIG. 25) side plates coupled to each other.
Figure 27:
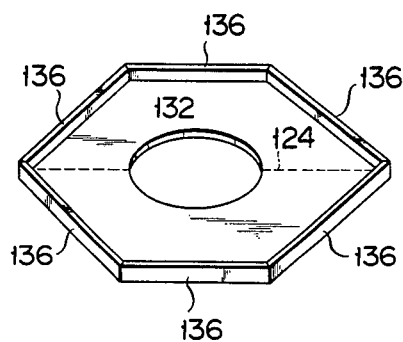
FIG. 27 is a perspective view of a bottom plate of the bowl in FIG. 25.
Figure 28:
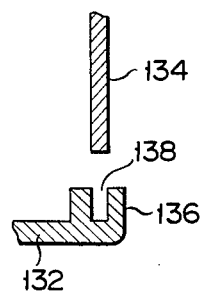
FIG. 28 is a sectional view showing a connecting structure of the side plates and the bottom plate.
Figure 29:
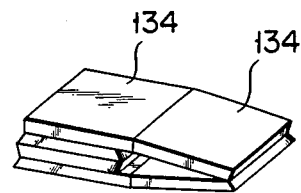
FIG. 29 is a perspective view showing a folded state of the side plates in FIG. 26.
Figure 30:
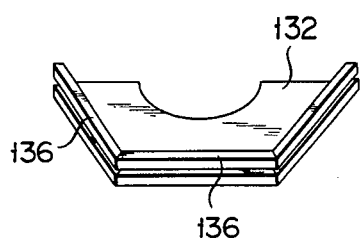
FIG. 30 is a perspective view showing a folded state of the bottom plate in FIG. 27.

FIGS. 25 to 30 show another foldable bowl 26b. In this embodiment, this bowl comprises hexagonal bottom plate 132 as in bowl 26a of FIG. 21, and six side plates 134. Plates 134 are coupled to each other through hinges (not shown) in FIG. 26. However, when plates 134 are developed, they constitute a single band. Supports 136 are respectively formed at sides of bottom plate 132. As shown in FIG. 28, groove 138 is formed in the upper surface of each support 136 to receive the corresponding side plate 134. According to this embodiment, side plates 134 are fitted in the corresponding grooves 138 of supports 136 of bottom plate 132 to cause six side plates 134 to stand on bottom plate 132, as shown in FIG. 25. However, when bowl 26b is not used, side plates 143 are separated from bottom plate 132, as shown in FIG. 26, and they are folded, as shown in FIGS. 29 and 30, thereby allowing storage in a compact manner.

Figure 31:
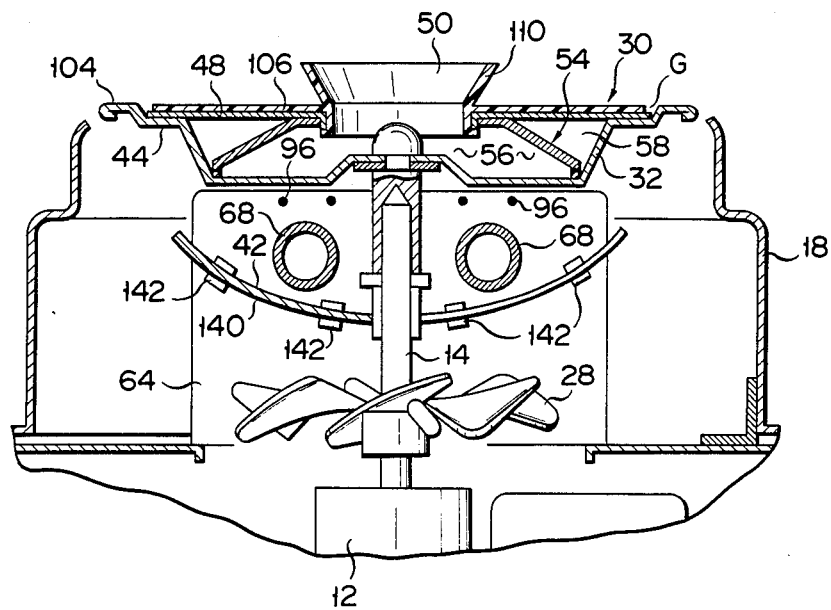
FIG. 31 is a partial sectional view of a cotton candy making machine with another deflection device.

Finally, FIG. 31 shows a modification of deflection device 82. Device 82 comprises single plate member 140 arcuated downward and a plurality of holders 142 for detachably holding plate member 140. Both ends of plate member 140 extend toward the peripheral edge of rotary member 30.

What is claimed is:

1. An apparatus for making a cotton candy, comprising:
   an electric motor having an output shaft extending upward;
   a fan rotated together with the output shaft to produce an upward air flow;
   heater means arranged above the fan;
   a rotary member arranged above the heater means and rotated together with the output shaft, the rotary member being provided with a sugar chamber defined inside the rotary member and path means for guiding molten sugar from the sugar chamber melted by heat from the heater means to a peripheral edge of the rotary member, the path means having openings open at the peripheral edge of the rotary member; and
   deflecting means, disposed between the heater means and the fan, for deflecting air flow from the fan upon rotation thereof toward the peripheral edge of the rotary member.

2. An apparatus according to claim 1, wherein the deflecting means includes a horizontal plate portion and a pair of inclined plate portions extending obliquely upward from at least two side portions of the horizontal plate portion toward the peripheral edge of the rotary member.

3. An apparatus according to claim 2, wherein surfaces of the horizontal and inclined plate portions which oppose the heater means are formed of reflecting surfaces for reflecting heat from the heater means toward the rotary member.

4. An apparatus according to claim 1, wherein the rotary member comprises a tray-like rotary vessel, a cover for covering an upper surface of the rotary vessel, the cover being provided with a central supply port for supplying sugar into the rotary vessel, and a partition member, disposed in the rotary vessel, for partitioning an interior of the rotary vessel into a radially inner chamber and a radially outer chamber, the sugar from the supply port being supplied to the radially inner chamber, and the path means extends from the radially inner chamber to the peripheral edge of the rotary member.

5. An apparatus according to claim 4, wherein the partition member includes a frustoconical hollow tapered pipe, a large-diameter open end of which is in contact with a bottom surface of the rotary vessel and a small-diameter open end of which communicates with the supply port.

6. An apparaturs according to claim 5, wherein an angle between the tapered pipe and the bottom surface of the rotary vessel is not more than 45°.

7. An apparatus according to claim 4, wherein the partition member comprises a hollow cylinder with a bottom wall and an open upper end, the bottom wall being in surface contact with a bottom surface of the rotary vessel, and the path means includes a plurality of slits in a peripheral wall of the hollow cylinder at predetermined intervals, the slits being adapted to extend from a bottom surface of the hollow cylinder along an axial direction thereof.

8. An apparatus according to claim 7, wherein the bottom wall of the rotary vessel has a hole for exposing the bottom wall of the hollow cylinder.

9. An apparatus according to claim 1, wherein the rotary member includes a coaxial connecting shaft, one end of which is coupled to the rotary member and the other end of which extends toward the output shaft of the electric motor and is connected thereto, the connecting shaft including a hole extending therethrough from said other end toward said one end of the connecting shaft to receive the output shaft and at least one slot formed in a lower end portion of the connecting shaft and extending from said other end toward said one end of the connecting shaft; and at least one radial pin member mounted on the output shaft of the electric motor, wherein the pin member can be fitted in the slot of the connecting shaft, said pin and said at least one slot comprising means for engaging and disengaging said connecting shaft and said output shaft by relative axial motion therebetween.

10. An apparatus according to claim 9, wherein the connecting shaft has a pair of slots formed in the connecting shaft at equal angular intervals, and the output shaft has a pair of pins extending in opposite radial directions and to be respectively fitted in the pair of slots.

11. An apparatus according to claim 9, wherein the connecting shaft has four slots formed in the connecting shaft at equal angular intervals, and the output shaft has a pair of pins extending in opposite radial directions and to be respectively fitted in the slots.

12. An apparatus according to claim 11, wherein the four slots are formed to constitute four arcuated surfaces in the hole of the connecting shaft at equal angular intervals.

13. An apparatus according to claim 1, further comprising a bowl surrounding the rotary member.

* * * * *